United States Patent
Nagasawa

(10) Patent No.: US 9,575,547 B2
(45) Date of Patent: Feb. 21, 2017

(54) INFORMATION PROCESSING APPARATUS, INFORMATION PROCESSING SYSTEM, AND COMPUTER PROGRAM PRODUCT

(71) Applicant: Yuichi Nagasawa, Kanagawa (JP)

(72) Inventor: Yuichi Nagasawa, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 259 days.

(21) Appl. No.: 14/141,535

(22) Filed: Dec. 27, 2013

(65) Prior Publication Data
US 2014/0201549 A1  Jul. 17, 2014

(30) Foreign Application Priority Data

Jan. 11, 2013  (JP) .................................. 2013-003793

(51) Int. Cl.
*G06F 1/32* (2006.01)
*G06F 3/12* (2006.01)

(52) U.S. Cl.
CPC .......... *G06F 1/3284* (2013.01); *G06F 1/3215* (2013.01); *G06F 3/1221* (2013.01); *G06F 3/1229* (2013.01); *G06F 3/1285* (2013.01); *Y02B 60/1267* (2013.01); *Y02B 60/1271* (2013.01)

(58) Field of Classification Search
CPC ..................................................... G06F 1/325
See application file for complete search history.

(56) References Cited

U.S. PATENT DOCUMENTS 5,580,177 A * 12/1996 Gase ..................... G06F 3/1204
  358/1.15
6,389,544 B1 * 5/2002 Katagiri .............. G06F 11/3055
  713/300

(Continued)

FOREIGN PATENT DOCUMENTS

JP  2005169623 A  6/2005
JP  2006215686 A  8/2006

(Continued)

OTHER PUBLICATIONS

Japanese Office Action mailed Nov. 1, 2016.

*Primary Examiner* — Kim Huynh
*Assistant Examiner* — Eric Chang
(74) *Attorney, Agent, or Firm* — Harness, Dickey & Pierce, P.L.C.

(57) ABSTRACT

An information processing apparatus includes: a power mode information storage unit that stores power mode information indicating whether a power mode of an electronic apparatus is a first power mode in which at least a first communication unit is operable or a second power mode in which the first communication unit is not operable and a second communication unit is operable; an update unit that updates the power mode information; a determination unit that refers to the power mode information and determines the power mode; a first acquisition unit that, if the power mode is the first power mode, obtains state information from the electronic apparatus via the first communication unit; a state information storage unit that stores the state information; and a second acquisition unit that, if the power mode is the second power mode, obtains the state information from the state information storage unit.

17 Claims, 7 Drawing Sheets

(56) References Cited

U.S. PATENT DOCUMENTS

| | | | |
|---|---|---|---|
| 7,072,989 B1* | 7/2006 | Kolokowsky | G06F 1/3203 710/14 |
| 2007/0279678 A1* | 12/2007 | Kobayashi | G03G 15/5016 358/1.15 |
| 2008/0120453 A1 | 5/2008 | Nagasawa | |
| 2011/0161720 A1 | 6/2011 | Nagasawa | |
| 2012/0047292 A1* | 2/2012 | Tamura | G06F 1/266 710/17 |
| 2013/0010317 A1* | 1/2013 | Sai | G06F 3/1221 358/1.13 |
| 2013/0063778 A1 | 3/2013 | Nagasawa | |

FOREIGN PATENT DOCUMENTS

| | | |
|---|---|---|
| JP | 2008186381 A | 8/2008 |
| JP | 2009-129242 | 6/2009 |

* cited by examiner

INFORMATION PROCESSING APPARATUS, INFORMATION PROCESSING SYSTEM, AND COMPUTER PROGRAM PRODUCT

CROSS-REFERENCE TO RELATED APPLICATIONS

The present application claims priority to and incorporates by reference the entire contents of Japanese Patent Application No. 2013-003793 filed in Japan on Jan. 11, 2013.

BACKGROUND OF THE INVENTION

1. Field of the Invention

The present invention relates to an information processing apparatus, an information processing system, and a computer program product.

2. Description of the Related Art

Some image forming apparatuses including a first communication unit and a second communication unit that consumes less power than the first communication unit can switch between a normal power mode and a power saving mode. In the normal power mode, the first and second communication units are operable. In the power saving mode, the first communication unit is not operable and the second communication unit is operable. Such an image forming apparatus accepts a normal power mode return instruction from a host apparatus by using its second communication unit in the power saving mode, and returns to the normal power mode. The image forming apparatus then receives a print job from the host apparatus by using the first communication unit, and performs printing (for example, see Japanese Laid-open Patent Publication No. 2009-129242).

According to such a technique, no power is supplied to the first communication unit in the power saving mode. This can further reduce the power consumption in the power saving mode.

The host apparatus sometimes performs communication with an electronic apparatus to check whether the electronic apparatus is in a state capable of predetermined processing.

According to the foregoing conventional technique, if the electronic apparatus is in the power saving mode, the host apparatus needs to return the electronic apparatus to the normal power mode to communicate with the electronic apparatus and check whether the electronic apparatus is in a state capable of predetermined processing. The checking thus increases the power consumption of the electronic apparatus.

In view of the foregoing circumstances, there is a need to provide an information processing apparatus, an information processing system, and a computer program product which can check whether an electronic apparatus is in a state capable of predetermined processing while keeping the power consumption of the electronic apparatus suppressed.

SUMMARY OF THE INVENTION

It is an object of the present invention to at least partially solve the problems in the conventional technology.

An information processing apparatus includes: a power mode information storage unit that stores power mode information indicating whether a power mode of an electronic apparatus including a first communication unit and a second communication unit is a first power mode in which at least the first communication unit is operable or a second power mode in which the first communication unit is not operable and the second communication unit is operable; an update unit that updates the power mode information based on a shift notification about the power mode from outside; a determination unit that refers to the power mode information and determines whether the power mode is the first power mode or the second power mode; a first acquisition unit that, if the power mode is the first power mode, obtains state information from the electronic apparatus via the first communication unit, the state information indicating whether the electronic apparatus is in a state capable of predetermined processing; a state information storage unit that stores the state information; and a second acquisition unit that, if the power mode is the second power mode, obtains the state information from the state information storage unit.

An information processing system includes: an information processing apparatus; and an electronic apparatus including a first communication unit and a second communication unit. The information processing apparatus includes: a power mode information storage unit that stores power mode information indicating whether a power mode of the electronic apparatus is a first power mode in which at least the first communication unit is operable or a second power mode in which the first communication unit is not operable and the second communication unit is operable; an update unit that updates the power mode information based on a shift notification about the power mode from outside; a determination unit that refers to the power mode information and determines whether the power mode is the first power mode or the second power mode; a first acquisition unit that, if the power mode is the first power mode, obtains state information from the electronic apparatus via the first communication unit, the state information indicating whether the electronic apparatus is in a state capable of predetermined processing; a state information storage unit that stores the state information; and a second acquisition unit that, if the power mode is the second power mode, obtains the state information from the state information storage unit. The electronic apparatus issues the shift notification when shifting the power mode.

A computer program product includes a non-transitory computer-usable medium having computer-readable program codes embodied in the medium. The program codes when executed cause a computer to function as: a power mode information storage unit that stores power mode information indicating whether a power mode of an electronic apparatus including a first communication unit and a second communication unit is a first power mode in which at least the first communication unit is operable or a second power mode in which the first communication unit is not operable and the second communication unit is operable; an update unit that updates the power mode information based on a shift notification about the power mode from outside; a determination unit that refers to the power mode information and determines whether the power mode is the first power mode or the second power mode; a first acquisition unit that, if the power mode is the first power mode, obtains state information from the electronic apparatus via the first communication unit, the state information indicating whether the electronic apparatus is in a state capable of predetermined processing; a state information storage unit that stores the state information; and a second acquisition unit that, if the power mode is the second power mode, obtains the state information from the state information storage unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

An embodiment of the information processing apparatus, the information processing system, and the computer program product according to the present invention will be described in detail below with reference to the accompanying drawings.

Initially, a configuration of an information processing system according to the present embodiment will be described.

Figure 1:
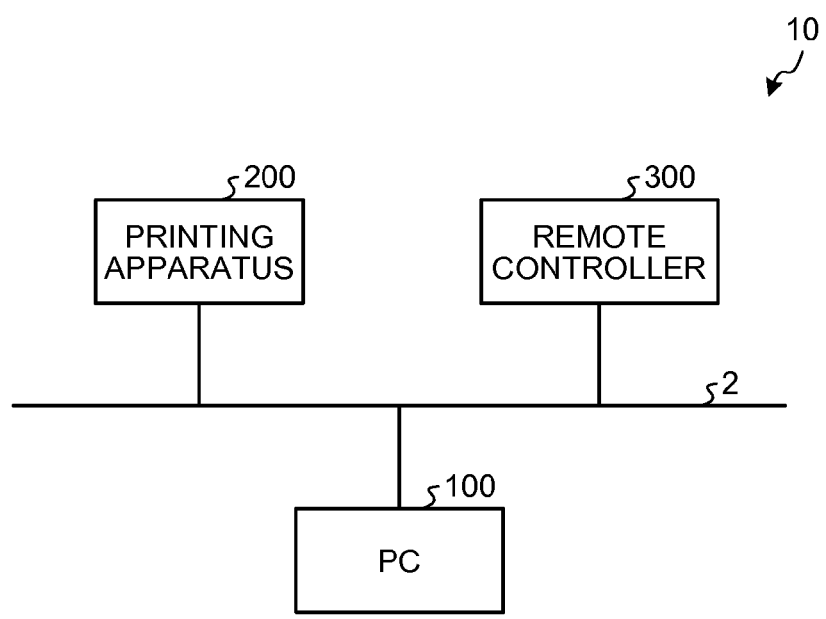
FIG. 1 is a block diagram illustrating an example of the configuration of an information processing system according to an embodiment.

FIG. 1 is a block diagram illustrating an example of the configuration of the information processing system 10 according to the present embodiment. As illustrated in FIG. 1, the information processing system 10 includes a personal computer (PC) 100 (an example of an information processing apparatus), a printing apparatus 200 (an example of an electronic apparatus), and a remote controller 300 (an example of a remote control apparatus).

The PC 100, the printing apparatus 200, and the remote controller 300 are connected via a network 2. For example, the network 2 may be implemented by the Internet, a local area network (LAN), etc.

Figure 2:
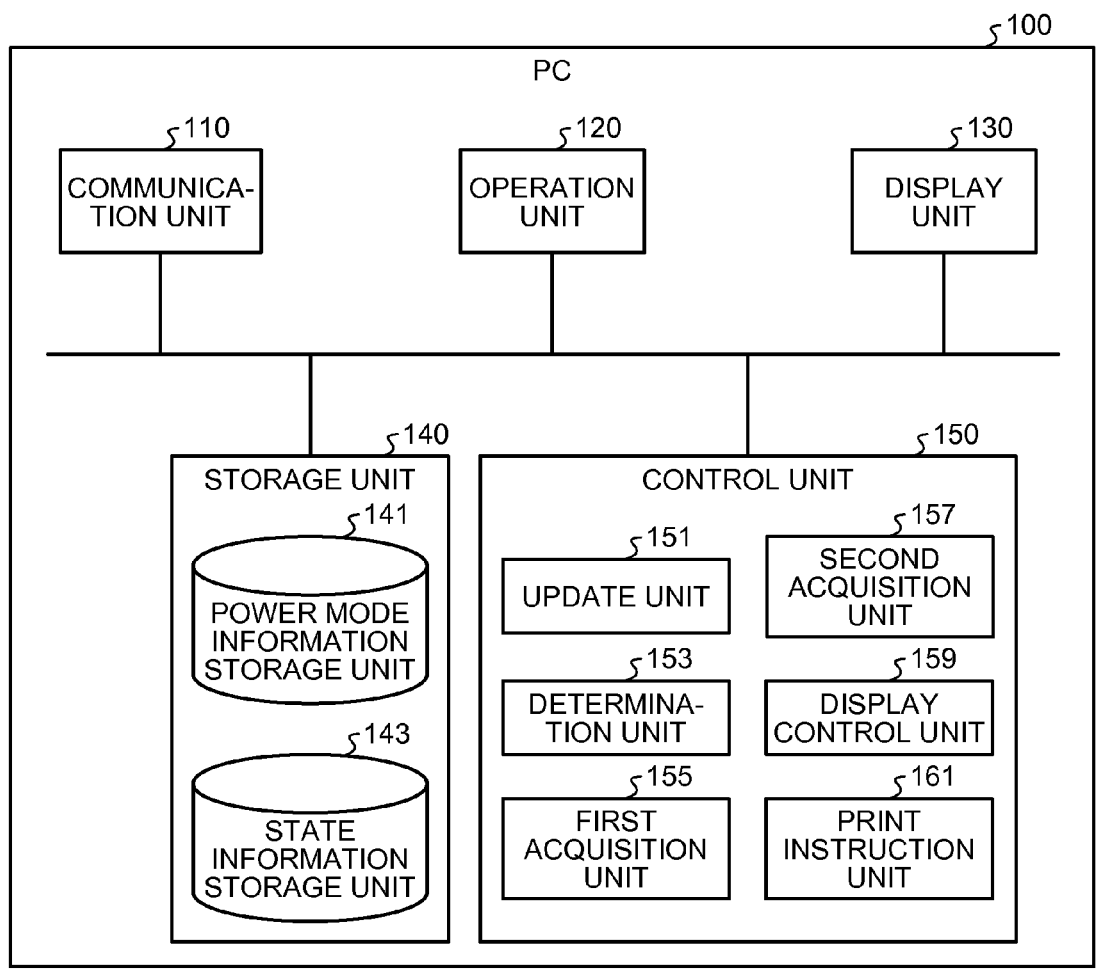
FIG. 2 is a block diagram illustrating an example of the configuration of a PC according to the present embodiment.

FIG. 2 is a block diagram illustrating an example of the configuration of the PC 100 according to the present embodiment. As illustrated in FIG. 2, the PC 100 includes a communication unit 110, an operation unit 120, a display unit 130, a storage unit 140, and a control unit 150.

The communication unit 110 communicates with external apparatuses such as the printing apparatus 200 and the remote controller 300 via the network 2. The communication unit 110 may be implemented by a network interface card (NIC) or the like.

The operation unit 120 is used for inputting various operations. The operation unit 120 may be implemented by an input device such as a keyboard, a mouse, a touch pad, and a touch panel.

The display unit 130 displays various screens. The display unit 130 may be implemented by a display device such as a liquid crystal display and a touch panel display.

The storage unit 140 stores various programs to be executed by the PC 100 and various types of data for use in various types of processing performed by the PC 100. The storage unit 140 may be implemented by at least one of magnetically, optically, and electrically storable storage devices such as a hard disk drive (HDD), a solid state drive (SSD), a memory card, an optical disk, a read only memory (ROM), and a random access memory (RAM).

The storage unit 140 includes a power mode information storage unit 141 and a state information storage unit 143.

The power mode information storage unit 141 stores power mode information indicating whether a power mode of the printing apparatus 200 is a normal power mode (an example of a first power mode) or a power saving mode (an example of a second power mode).

The state information storage unit 143 stores state information indicating whether the printing apparatus 200 is in a state capable of predetermined processing. The present embodiment deals with an example where the predetermined processing is printing. However, the predetermined processing is not limited thereto.

The control unit 150 controls the respective units of the PC 100. The control unit 150 may be implemented by a control device such as a central processing unit (CPU). The control unit 150 includes an update unit 151, a determination unit 153, a first acquisition unit 155, a second acquisition unit 157, a display control unit 159, and a print instruction unit 161 (an example of a printer driver). The control unit 150 activates (executes) a program stored in the storage unit 140 to implement the update unit 151, the determination unit 153, the first acquisition unit 155, the second acquisition unit 157, the display control unit 159, and the print instruction unit 161 as software.

The update unit 151 updates the power mode information stored in the power mode information storage unit 141 based on a shift notification about the power mode from the printing apparatus 200. For example, if the shift notification is a notification of a shift to the normal power mode, the update unit 151 updates the power mode information so that the power mode information indicates the normal power mode. If the shift notification is a notification of a shift to the power saving mode, the update unit 151 updates the power mode information so that the power mode information indicates the power saving mode.

The determination unit 153 refers to the power mode information in the power mode information storage unit 141 and determines whether the power mode of the printing apparatus 200 is the normal power mode or the power saving mode. For example, the determination unit 153 determines whether the power mode of the printing apparatus 200 is the normal power mode or the power saving mode based on the occurrence of a state information acquisition event.

If the power mode of the printing apparatus 200 is the normal power mode, the first acquisition unit 155 obtains the state information from the printing apparatus 200 and stores the state information in the state information storage unit 143.

If the power mode of the printing apparatus 200 is the power saving mode, the second acquisition unit 157 obtains the state information from the state information storage unit 143.

The display control unit 159 displays whether the printing apparatus 200 is in a printable state, on the display unit 130 based on the state information obtained by the first acquisition unit 155 or the state information obtained by the second acquisition unit 157.

If the power mode of the printing apparatus 200 is the normal power mode, the print instruction unit 161 transmits a print job to the printing apparatus 200 and instructs the printing apparatus 200 to print.

If the power mode of the printing apparatus 200 is the power saving mode, the print instruction unit 161 transmits a shift instruction to shift the printing apparatus 200 to the normal power mode to the remote controller 300. As a result, the remote controller 300 transmits the shift instruction for the normal power mode to the printing apparatus 200, and the printing apparatus 200 shifts (returns) to the normal power mode. The print instruction unit 161 then transmits a print job to the printing apparatus 200 shifted to the normal power mode, and instructs the printing apparatus 200 to print.

The PC 100 need not necessarily include all the foregoing units. Some of the units may be omitted.

Figure 3:
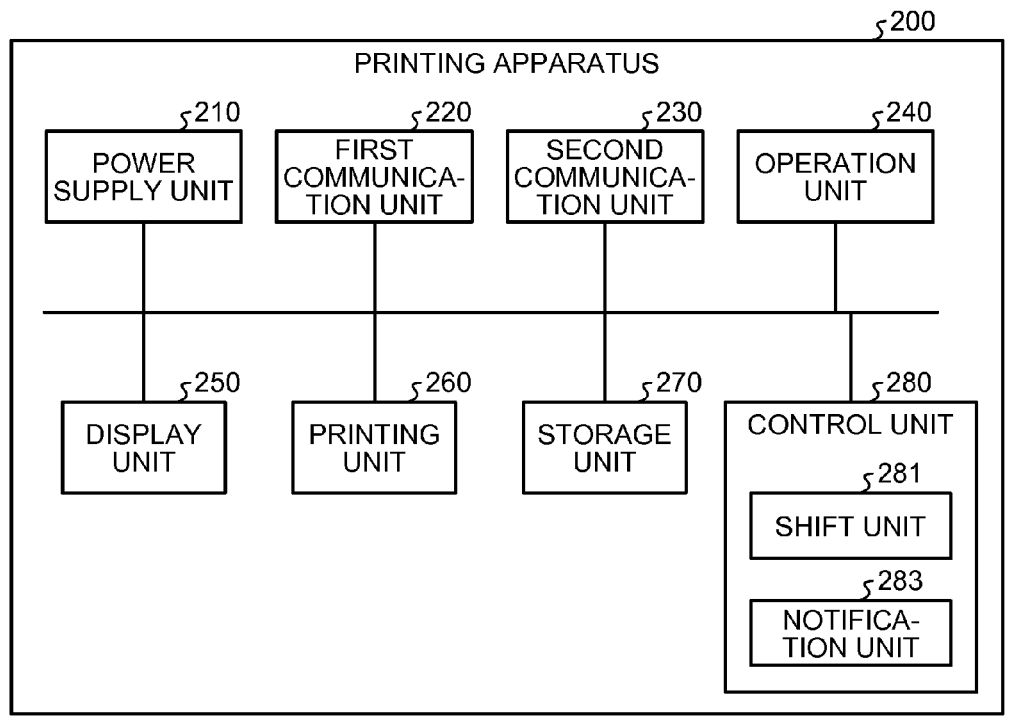
FIG. 3 is a block diagram illustrating an example of the configuration of a printing apparatus according to the present embodiment.

FIG. 3 is a block diagram illustrating an example of the configuration of the printing apparatus 200 according to the present embodiment. As illustrated in FIG. 3, the printing apparatus 200 includes a power supply unit 210, a first communication unit 220, a second communication unit 230, an operation unit 240, a display unit 250, a printing unit 260, a storage unit 270, and a control unit 280.

The power supply unit 210 supplies power to the respective units of the printing apparatus 200. If the power mode of the printing apparatus 200 is the normal power mode, the power supply unit 210 supplies power to the respective units of the printing apparatus 200 including the first communication unit 220, the second communication unit 230, the operation unit 240, the display unit 250, the printing unit 260, the storage unit 270, and the control unit 280. That is, in the normal power mode, at least the first communication unit 220 is operable.

If the power mode of the printing apparatus 200 is the power saving mode, the power supply unit 210 supplies power to the second communication unit 230 and not to the other units of the printing apparatus 200 such as the first communication unit 220. That is, in the power saving mode, the first communication unit 220 is not operable and the second communication unit 230 is operable.

The first communication unit 220 communicates with an external apparatus such as the PC 100 via the network 2. The first communication unit 220 may be implemented by a NIC or the like.

According to the present embodiment, in the normal power mode, the first communication unit 220 is supplied with power. The first communication unit 220 is thus operable and can communicate with the PC 100. In the power saving mode, no power is supplied to the first communication unit 220. The first communication unit 220 is thus inoperable and cannot communicate with the PC 100.

The second communication unit 230 communicates with external apparatuses such as the remote controller 300. The second communication unit 230 can be a communication unit that consumes less power than the first communication unit 220. For example, the second communication unit 230 may be implemented by a wireless communication unit that performs general-purpose short range wireless communications such as an infrared communication unit, a specific low-power wireless communication unit, Bluetooth (registered trademark), Zibgee (registered trademark), and EnOcean, a proprietary wireless communication unit or the like.

The operation unit 240 is used for inputting various operations. The operation unit 240 may be implemented by an input device such as a key switch and a touch panel.

The display unit 250 displays various screens. The display unit 250 may be implemented by display devices such as a liquid crystal display and a touch panel display.

The printing unit 260 performs printing based on a print job transmitted from the PC 100 to the first communication unit 220 via the network 2.

The storage unit 270 stores various programs to be executed by the printing apparatus 200 and various types of data for use in various types of processing performed by the printing apparatus 200. The storage unit 270 may be implemented by at least one of magnetically, optically, and electrically storable storage devices such as a HDD, an SSD, a memory card, an optical disk, a ROM, and a RAM. For example, the storage unit 270 stores state information indicating whether the printing apparatus 200 is in a printable state.

The control unit 280 controls the respective units of the printing apparatus 200. The control unit 280 may be implemented by a control device such as a CPU. The control unit 280 includes a shift unit 281 and a notification unit 283. The control unit 280 activates (executes) a program or programs stored in the storage unit 270 to implement the shift unit 281 and the notification unit 283 as software.

The shift unit 281 shifts the power mode of the printing apparatus 200. For example, the shift unit 281 shifts the power mode from the normal power mode to the power saving mode if the printing apparatus 200 has not been used for a certain time. For example, the shift unit 281 shifts the power mode from the power saving mode to the normal power mode based on a shift instruction for the normal power mode transmitted from the remote controller 300 to the second communication unit 230.

When the shift unit 281 shifts the power mode, the notification unit 283 issues a shift notification about the power mode of the printing apparatus 200. For example, when the shift unit 281 shifts the power mode from the normal power mode to the power saving mode, the notification unit 283 issues a shift notification about the shift to the power saving mode from the first communication unit 220 to the PC 100 via the network 2. For example, when the shift unit 281 shifts the power mode from the power saving mode to the normal power mode, the notification unit 283 issues a shift notification about the shift to the normal power mode from the first communication unit 220 to the PC 100 via the network 2.

The printing apparatus 200 need not necessarily include all the foregoing units. Some of the units may be omitted.

Figure 4:
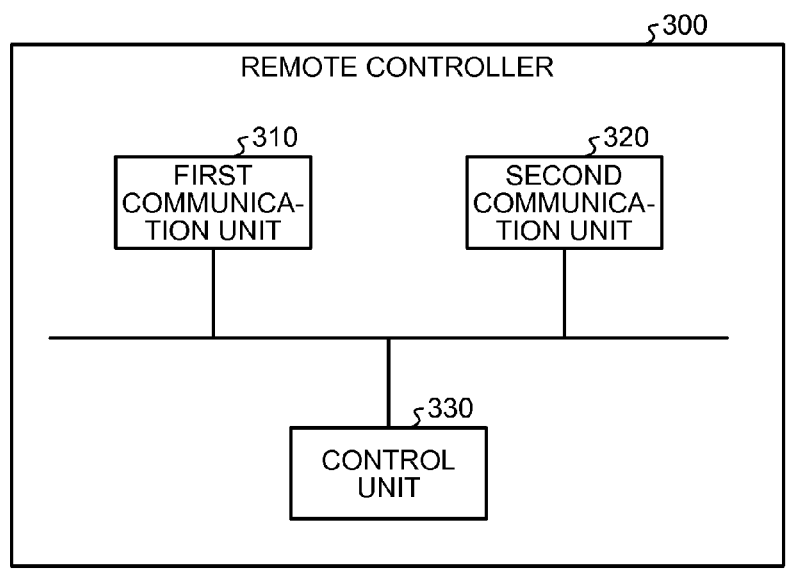
FIG. 4 is a block diagram illustrating an example of the configuration of a remote controller according to the present embodiment.

FIG. 4 is a block diagram illustrating an example of the configuration of the remote controller 300 according to the present embodiment. As illustrated in FIG. 4, the remote controller 300 includes a first communication unit 310, a second communication unit 320, and a control unit 330.

The first communication unit 310 communicates with external apparatuses such as the PC 100 via the network 2. The first communication unit 310 may be implemented by a NIC.

The second communication unit 320 communicates with external apparatuses such as the printing apparatus 200. Like the second communication unit 230 of the printing apparatus 200, the second communication unit 230 may be implemented by a wireless communication unit performing general-purpose short range wireless communications such as an infrared communication unit, a specific low-power wireless communication unit, Bluetooth (registered trademark), Zibgee (registered trademark), and EnOcean, a proprietary wireless communication unit or the like.

The control unit 330 controls the respective units of the remote controller 300. The control unit 330 may be implemented by a control device such as a CPU. If a shift instruction for the normal power mode is transmitted from the PC 100 to the first communication unit 310 via the network 2, the control unit 330 transmits the shift instruction from the second communication unit 320 to the printing apparatus 200.

The remote controller 300 need not necessarily include all the foregoing units. Some of the units may be omitted.

Next, the operation of the information processing system according to the present embodiment will be described.

Figure 5:
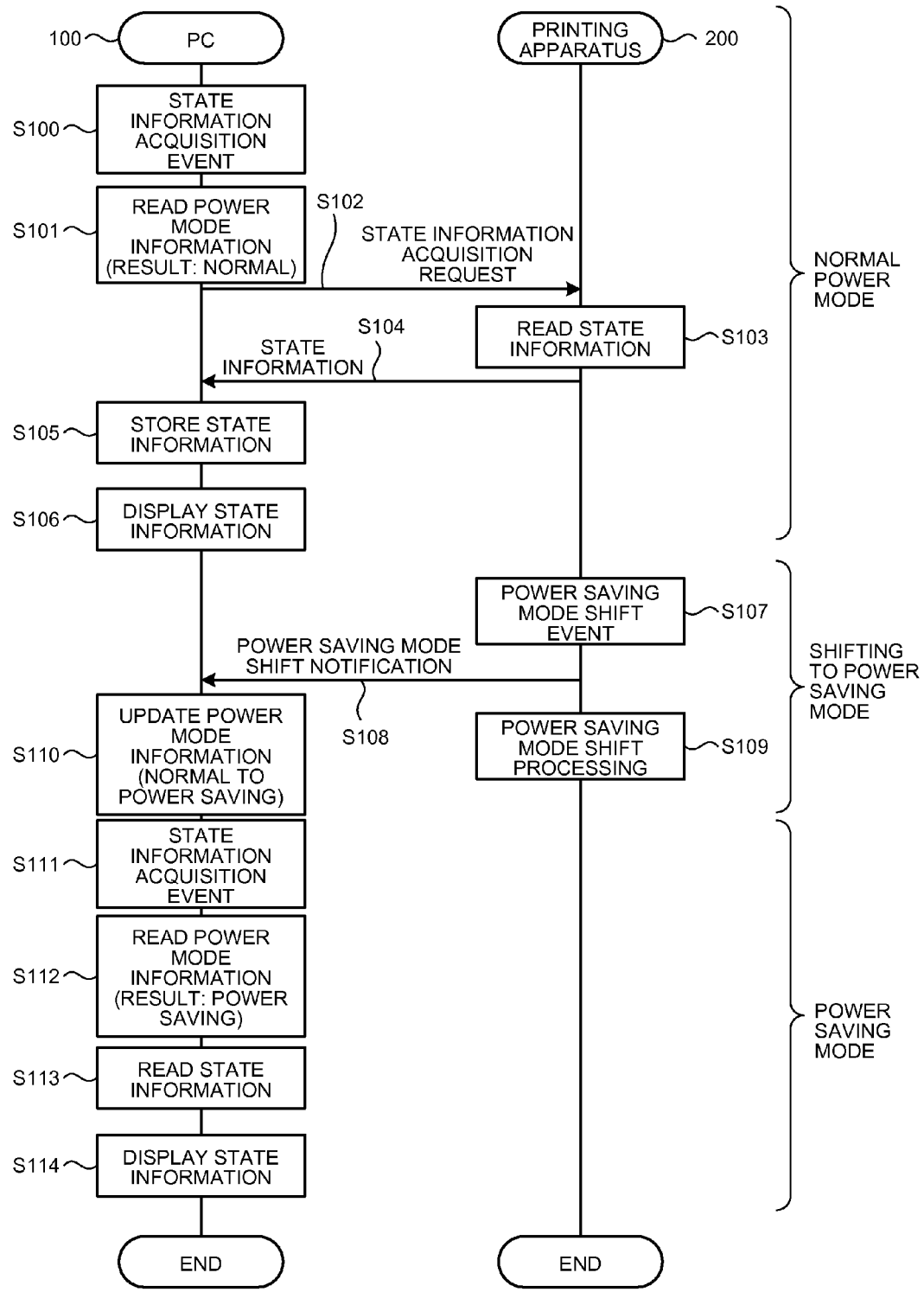
FIG. 5 is a flowchart illustrating an example of processing performed by the information processing system according to the present embodiment.

FIG. 5 is a flowchart illustrating an example of processing performed by the information processing system 10 according to the present embodiment. In the example illustrated in FIG. 5, the printing apparatus 200 starts processing, though not limited to, in the normal power mode.

Initially, a state information acquisition event occurs due to a user operation or an application (step S100). The determination unit 153 of the PC 100 reads the power mode information in the power mode information storage unit 141, and determines that the power mode of the printing apparatus 200 is the normal power mode (step S101).

Since the power mode of the printing apparatus 200 is the normal power mode, the first acquisition unit 155 of the PC 100 issues a state information acquisition request to the first communication unit 220 of the printing apparatus 200 via the network 2 (step S102). The control unit 280 of the printing apparatus 200 receives the state information acquisition request by using the first communication unit 220. The control unit 280 reads the state information from the storage unit 270 (step S103), and notifies the PC 100 of the read state information from the first communication unit 220 via the network 2 (step S104). As a result, the first acquisition unit 155 obtains the state information and stores the state information in the state information storage unit 143 (step S105).

The display control unit 159 of the PC 100 then displays the obtained state information (whether the printing apparatus 200 is in a printable state) on the display unit 130 (step S106). Note that the usage of the state information is not limited thereto. The state information may be used according to the intended use.

During the period of steps S100 to S106, the power mode of the printing apparatus 200 is the normal power mode.

Next, a shift event into the power saving mode occurs due to a user operation or for reasons such as because the printing apparatus 200 has not been used for a certain time (step S107). The notification unit 283 of the printing apparatus 200 issues a shift notification about the shift to the power saving mode from the first communication unit 220 to the PC 100 via the network 2 (step S108). The shift unit 281 of the printing apparatus 200 then performs shift processing into the power saving mode (step S109).

Based on the shift notification about the shift to the power saving mode from the printing apparatus 200, the update unit 151 of the PC 100 updates the power mode information in the power mode information storage unit 141 so that the power mode information indicates the power saving mode (step S110).

The period of steps S107 to S110 is the period in which the printing apparatus 200 shifts to the power saving mode.

Next, a state information acquisition event occurs due to a user operation or an application (step S111). The determination unit 153 reads the power mode information in the power mode information storage unit 141, and determines that the power mode of the printing apparatus 200 is the power saving mode (step S112).

Since the power mode of the printing apparatus 200 is the power saving mode, the second acquisition unit 157 of the PC 100 obtains the state information from the state information storage unit 143 (step S113). The display control unit 159 of the PC 100 displays the obtained state information (whether the printing apparatus 200 is in a printable state) on the display unit 130 (step S114).

During the period of steps S111 to S114, the power mode of the printing apparatus 200 is the power saving mode.

As described above, in the present embodiment, the state information obtained from the printing apparatus is stored in the PC. When the printing apparatus is in a power saving state, the state information is obtained not from the printing apparatus but from the PC. Therefore, according to the present embodiment, even when the printing apparatus is in the power saving state, the state information about the printing apparatus can be obtained without returning the printing apparatus to the normal power state. It is therefore possible to check whether the printing apparatus is in a printable state while keeping the power consumption of the printing apparatus suppressed. In other words, according to the present embodiment, whether the printing apparatus is in a printable state can be checked even when the printing apparatus is in the power saving state.

In the present embodiment, whether the printing apparatus is in a printable state can be checked while keeping the power consumption of the printing apparatus suppressed, without providing the PC with a communication unit corresponding to the second communication unit of the printing apparatus. Consequently, the cost and power consumption of the PC can also be suppressed.

In the present embodiment, whether the printing apparatus is in a printable state can be checked while keeping the power consumption of the printing apparatus suppressed, without the printing apparatus transmitting the status information to the remote controller and the remote controller retaining the status information. Consequently, the cost and power consumption of the remote controller can also be suppressed.

Note that the present embodiment assumes that the state of the printing apparatus will not change (whether the printing apparatus is in a printable state will not change) between when the PC stores the state information obtained from the printing apparatus and when the PC checks whether the printing apparatus is in a printable state by using the state information.

(Modifications)

The present invention is not limited to the foregoing embodiment, and various modifications may be made thereto.

(Modification 1)

Modification 1 deals with a case where the update (storing) timing of the state information is different from the foregoing embodiment.

Figure 6:
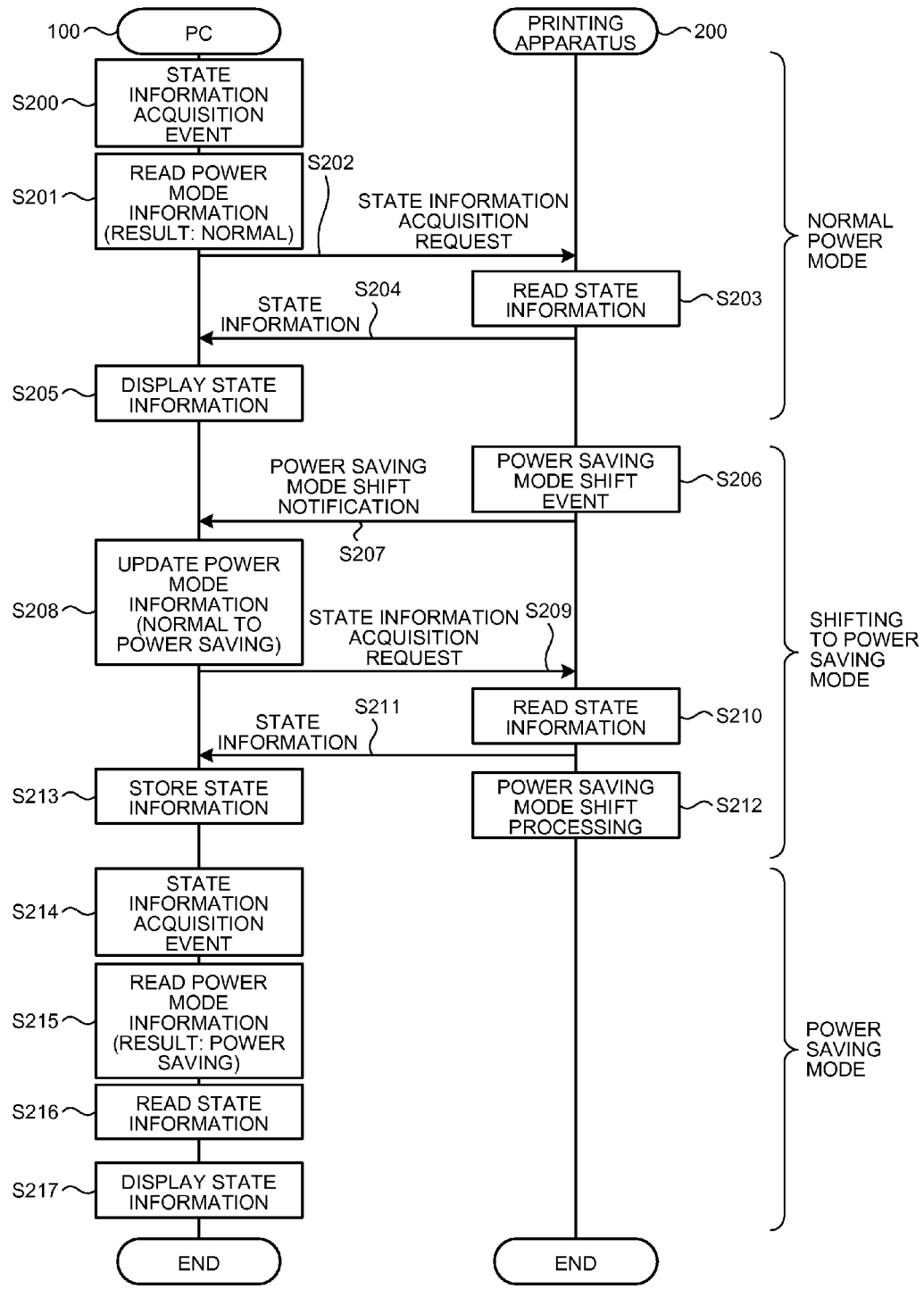
FIG. 6 is a flowchart illustrating an example of processing performed by an information processing system according to modification 1.

FIG. 6 is a flowchart illustrating an example of the processing performed by the information processing system according to modification 1. Even in the example illustrated in FIG. 6, the printing apparatus 200 starts processing, though not limited to, in the normal power mode.

The processing of steps S200 to S204 is the same as that of steps S100 to S104 of the flowchart illustrated in FIG. 5.

Next, the first acquisition unit 155 obtains the state information from the printing apparatus 200. The display control unit 159 of the PC 100 displays the obtained state information (whether the printing apparatus 200 is in a printable state) on the display unit 130 (step S205). Note that the usage of the state information is not limited thereto. The state information may be used according to the intended use.

During the period of steps S200 to S205, the power mode of the printing apparatus 200 is the normal power mode.

Next, a shift event into the power saving mode occurs due to a user operation or for reasons such as because the printing apparatus 200 has not been used for a certain time (step S206). The notification unit 283 of the printing apparatus 200 issues a shift notification about the shift to the power saving mode from the first communication unit 220 to the PC 100 via the network 2 (step S207).

Based on the shift notification about the shift to the power saving mode from the printing apparatus 200, the update unit 151 of the PC 100 updates the power mode information in the power mode information storage unit 141 so that the power mode information indicates the power saving mode (step S208).

Since the shift notification of step S207 is a notification of the shift to the power saving mode, the first acquisition unit 155 of the PC 100 issues a state information acquisition request to the first communication unit 220 of the printing apparatus 200 via the network 2 (step S209). The control unit 280 of the printing apparatus 200 receives the state information acquisition request by using the first communication unit 220. The control unit 280 reads the state information from the storage unit 270 (step S210), and notifies the PC 100 of the read state information from the first communication unit 220 via the network 2 (step S211). The shift unit 281 of the printing apparatus 200 then performs the shift processing into the power saving mode (step S212).

Consequently, the first acquisition unit 155 obtains the state information and stores the state information in the state information storage unit 143 (step S213).

The period of steps S206 to S213 is the period in which the printing apparatus 200 shifts to the power saving mode.

The processing of steps S214 to S217 is the same as that of steps S111 to S114 of the flowchart illustrated in FIG. 5.

During the period of steps S214 to S217, the power mode of the printing apparatus 200 is the power saving mode.

According to modification 1, the state information is obtained and stored into the PC when the printing apparatus shifts to the power saving state. As a result, the period from when the PC stores the state information obtained from the printing apparatus to when the PC checks whether the printing apparatus is in a printable state by using the state information can be made shorter than in the foregoing embodiment. Such a modification is useful if the state of the printing apparatus can change (whether the printing apparatus is in a printable state can change) between when the PC obtains the state information from the printing apparatus and when the PC checks whether the printing apparatus is in a printable state by using state information.

(Modification 2)

Modification 2 deals with an example where there are a plurality of PCs and the printing apparatus issues a shift notification to all the PCs.

Figure 7:
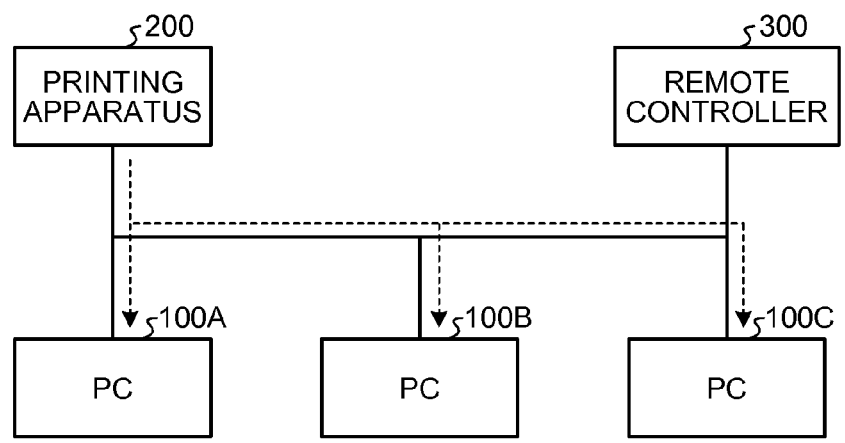
FIG. 7 is a block diagram illustrating an operation example of an information processing system according to modification 2.

FIG. 7 is a block diagram illustrating an operation example of the information processing system according to modification 2. As illustrated in FIG. 7, modification 2 differs from the foregoing embodiment in that there are three PCs 100A to 100C. The PCs 100A to 100C each have the same configuration as that of the PC 100 according to the foregoing embodiment. The number of PCs is not limited thereto. The information processing system may include any number of a plurality of PCs.

In modification 2, when the power mode shifts, the notification unit 283 of the printing apparatus 200 issues a shift notification about the power mode of the printing apparatus 200 to the PCs 100A to 100C.

In such a manner, the technique of the foregoing embodiment can be applied even when the information processing system includes a plurality of PCs.

(Modification 3)

Modification 3 deals with an example where there are a plurality of PCs and the printing apparatus efficiently issues a shift notification to all the PCs.

Figure 8:
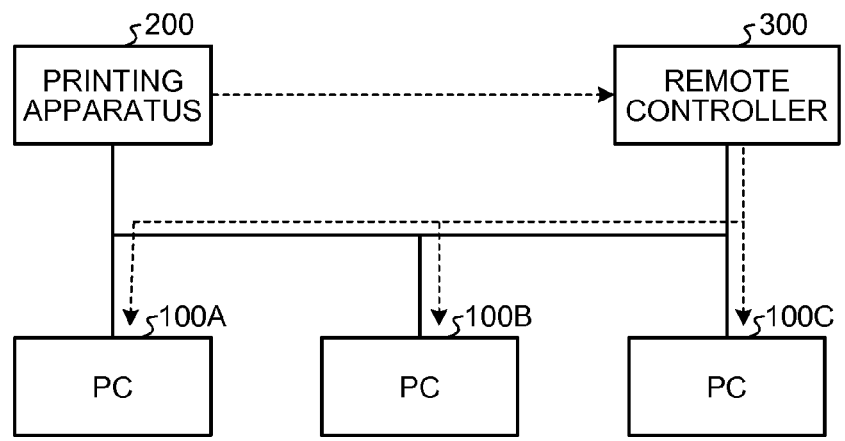
FIG. 8 is a block diagram illustrating an operation example of an information processing system according to modification 3.

FIG. 8 is a block diagram illustrating an operation example of the information processing apparatus according to modification 3. As illustrated in FIG. 8, modification 3 differs from the foregoing embodiment in that there are three PCs 100A to 100C. The PCs 100A to 100C each have the same configuration as that of the PC 100 according to the foregoing embodiment. The number of PCs is not limited thereto. The information processing system may include any number of a plurality of PCs.

In modification 3, when the power mode shifts, the notification unit 283 of the printing apparatus 200 issues a shift notification about the power mode of the printing apparatus 200 to the remote controller 300. The remote controller 300 issues a shift notification about the power mode of the printing apparatus 200 to the PCs 100A to 100C.

In such a manner, the technique of the foregoing embodiment can be applied even when the information processing system includes a plurality of PCs. In particular, according to the technique of modification 3, the printing apparatus need not issue the shift notification to all the plurality of PCs, but to the remote controller. According to the technique of modification 3, the transmission time of the shift notification by the printing apparatus can be reduced and the shift time of the power mode can be reduced as compared to the technique of modification 2. The power mode can thus be shifted more quickly.

(Modification 4)

Modification 4 deals with an example where the printing apparatus is in the power saving mode when a PC returns from a state in which the PC cannot obtain the state information from the printing apparatus to a state in which the PC can obtain the status information. In such a case, the PC obtains the status information from another PC.

Figure 9:
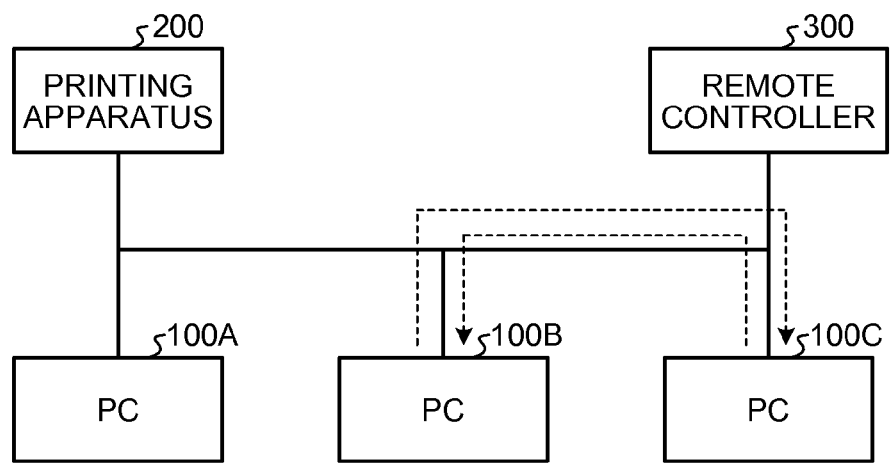
FIG. 9 is a block diagram illustrating an operation example of an information processing system according to modification 4.

FIG. 9 is a block diagram illustrating an operation example of the information processing apparatus according to modification 4. As illustrated in FIG. 9, modification 4 differs from the foregoing embodiment in that there are three PCs 100A to 100C. The PCs 100A to 100C each have the same configuration as that of the PC 100 according to the foregoing embodiment. The number of PCs is not limited thereto. The information processing system may include any number of a plurality of PCs.

In modification 4, when the power mode shifts, the notification unit 283 of the printing apparatus 200 directly or indirectly issues a shift notification about the power mode of the printing apparatus 200 to the PCs 100A to 100C as described in modification 2 or 3.

According to modification 4, when the PC 100C returns from a state in which the PC 100C cannot obtain the state information from the printing apparatus 200 to a state in which the PC 100C can obtain the state information, for example, when activated (powered on), the first acquisition unit 155 of the PC 100C obtains the state information about the printing apparatus 200 from the PC 100B and stores the state information in the state information storage unit 143.

Immediately after the activation of the PC 100C or on another similar occasion, whether the printing apparatus 200 is in a printable state may be unknown to the PC 1000. Even in such cases, the PC 100C can obtain the state information about the printing apparatus without returning the printing apparatus from the power saving state to the normal power state. Whether the printing apparatus is in a printable state can thus be checked while keeping the power consumption of the printing apparatus suppressed.

Modification 4 has dealt with the case of obtaining the state information from another PC. However, this is not restrictive. If there are a plurality of printing apparatuses and the printing apparatuses are configured to store each other's state information, the state information may be obtained from another printing apparatus.

(Modification 5)

Modification 5 deals with an example where the printing apparatus is in the power saving mode when a PC returns from a state in which the PC cannot obtain the state information from the printing apparatus to a state in which the PC can obtain the state information. In such a case, the PC makes the printing apparatus return to the normal power mode and obtains the state information.

Figure 10:
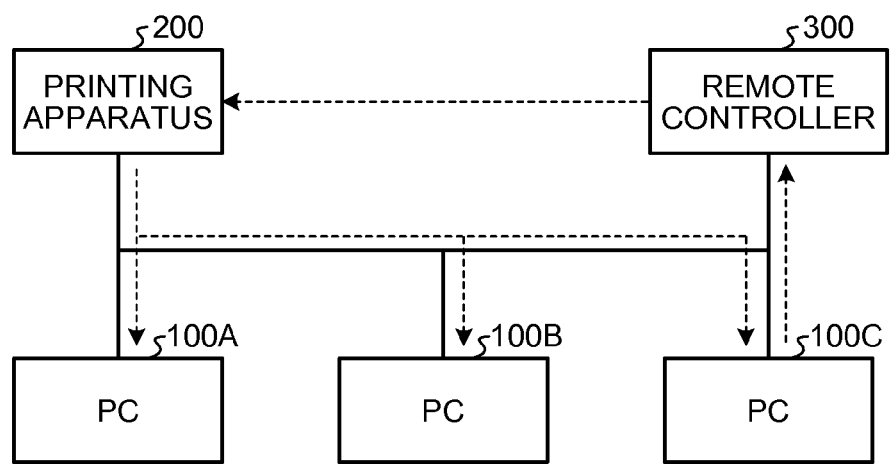
FIG. 10 is a block diagram illustrating an operation example of an information processing system according to modification 5.

FIG. 10 is a block diagram illustrating an operation example of the information processing system according to modification 5. As illustrated in FIG. 10, modification 5 assumes that there are three PCs 100A to 100C, and the PCs 100A to 100C each have the same configuration as that of the PC 100 according to the foregoing embodiment. The number of PCs is not limited thereto. The information processing system may include one PC as in the foregoing embodiment. A plurality of PCs may be included.

According to modification 5, when the PC 100C returns from a state where the PC 100C cannot obtain the state information from the printing apparatus to a state where the PC 1000 can obtain the state information, for example, when activated (powered on), the first acquisition unit 155 of the PC 100C transmits a shift instruction to shift the printing apparatus 200 from the power saving mode to the normal power mode to the remote controller 300. The remote controller 300 transmits the shift instruction to the printing apparatus 200 in the power saving mode.

Based on the shift instruction, the shift unit 281 of the printing apparatus 200 shifts the power mode from the power saving mode to the normal power mode. The notification unit 283 issues a shift notification about the shift of the printing apparatus 200 to the normal power mode to the PCs 100A to 100C. The notification unit 283 may issue the shift notification via the remote controller 300 as in modification 3.

Based on the shift notification about the shift of the printing apparatus 200 to the normal power mode, the update unit 151 of the PC 100C then updates the power mode information so that the power mode information indicates the normal power mode. The determination unit 153 refers to the power mode information and determines that the power mode of the printing apparatus 200 is the normal power mode. Since the power mode of the printing apparatus 200 is the normal power mode, the first acquisition unit 155 obtains the state information from the printing apparatus 200 and stores the state information in the state information storage unit 143.

Immediately after the activation of the PC 100C or on another similar occasion, whether the printing apparatus 200 is in a printable state may be unknown to the PC 1000. Even in such cases, the PC 100C can check whether the printing apparatus 200 is in a printable state.

(Modification 6)

The foregoing embodiment and the modifications have been described by using an example where there is one remote controller. However, a plurality of remote controllers may be provided if needed in consideration of the coverage of wireless communications. Alternatively, multi-hop communication may be used to extend the range of wireless communications without providing a plurality of remote controllers.

(Modification 7)

The foregoing embodiment and the modifications have been described by using a printing apparatus as an example of the electronic apparatus. However, this is not restrictive. Various electronic apparatuses may be used, including image forming apparatuses such as a copying machine, a multifunction peripheral (MFP), and a facsimile apparatus, and projectors. For example, if the electronic apparatus is a projector, the predetermined processing may be image projection. An MFP has at least two of the functions including a copying function, a printing function, a scanner function, and a facsimile function.

(Modification 8)

The foregoing embodiment and the modifications have been described by using a PC(s) as an example of the information processing apparatus(es). However, this is not restrictive. Tablets, smartphones, and the like may be used. If there are a plurality of information processing apparatuses, different types of apparatuses (for example, a PC and a tablet) may be included at the same time.

(Hardware Configuration)

An example of the hardware configuration of the PCs according to the present embodiment and the modifications will be described. The PCs according to the present embodiment and the modifications each include a control device such as a CPU, a storage device such a ROM and a RAM, an external storage device such as a HDD and an SSD, a display device such as a display, an input device such as a mouse and a keyboard, and a communication device such as a NIC. Each PC can be implemented by a hardware configuration using an ordinary computer.

The programs to be executed by the PCs of the present embodiment and the modifications are provided as installable or executable files stored in a computer-readable storage medium such as a CD-ROM, a CD-R, a memory card, a digital versatile disk (DVD), and a flexible disk (ED).

The programs to be executed by the PCs of the present embodiment and the modifications may be stored in a computer connected to a network such as the Internet, and may be provided by downloading via the network. The programs to be executed by the PCs of the present embodiment and the modifications may be provided or distributed over a network such as the Internet. The programs to be executed by the PCs of the present embodiment and the modifications may be provided as preinstalled in a ROM or the like.

The programs to be executed by the PCs of the present embodiment and the modifications each have modular construction for implementing the foregoing respective units on a computer. In terms of actual hardware, the control device reads the programs from the external storage device onto the storage device and executes the programs, whereby the respective units are implemented on the computer.

According to the embodiment, whether the electronic apparatus is in a state capable of predetermined processing can be checked while keeping the power consumption of the electronic apparatus suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a memory configured to,
      store power mode information indicating whether a power mode of an electronic apparatus including a first communication unit and a second communication unit is a first power mode in which at least the first communication unit is operable or a second power mode in which the first communication unit is not operable and the second communication unit is operable, and
      store state information, the state information indicating whether the electronic apparatus is in a state capable of selected processing; and
   a controller configured to,
      update the power mode information based on a shift notification about the power mode of the electronic apparatus upon receiving the shift notification from an external device,
      refer to the power mode information and determine whether the power mode is the first power mode or the second power mode,
      obtain the state information from the electronic apparatus via the first communication unit if the power mode is the first power mode, and
      obtain the state information from the memory if the power mode is the second power mode until receiving a notification indicating that the power mode has changed to the first power mode.

2. The information processing apparatus according to claim 1, wherein the controller is configured to,
   determine whether the power mode is the first power mode or the second power mode based on an event of obtaining the state information; and
   obtain the state information from the electronic apparatus via the first communication unit if the power mode is the first power mode and store the state information in the memory.

3. The information processing apparatus according to claim 1, wherein the controller is configured to obtain the state information from the electronic apparatus via the first communication unit if the shift notification is a notification of a shift to the second power mode and store the state information in the memory.

4. The information processing apparatus of claim 1, wherein the second communication unit is configured to consume less power than the first communication unit.

5. The information processing apparatus of claim 1, wherein the controller is configured to,
   store the state information based on the shift notification,
   send an information request to the electronic apparatus, and
   obtain the state information indicating a shift from the first power mode to the second power mode, the controller configured to store the state information during the shift from the first power mode to the second power mode.

6. An information processing system comprising:
   at least one information processing apparatus; and
   an electronic apparatus including a first communication unit and a second communication unit, wherein
   the at least one information processing apparatus includes,
      a memory configured to,
         store power mode information indicating whether a power mode of the electronic apparatus is a first power mode in which at least the first communication unit is operable or a second power mode in which the first communication unit is not operable and the second communication unit is operable, and
         store state information, the state information indicating whether the electronic apparatus is in a state capable of selected processing; and
      a controller configured to,
         update the power mode information based on a shift notification about the power mode of the electronic apparatus upon receiving the shift notification from an external device,
         refer to the power mode information and determine whether the power mode is the first power mode or the second power mode,
         obtain the state information from the electronic apparatus via the first communication unit if the power mode is the first power mode, and
         obtain the state information from the state information storage unit if the power mode is the second power until receiving a notification indicating that the power mode has changed to the first power mode, and
   the electronic apparatus issues the shift notification when shifting the power mode.

7. The information processing system according to claim 6, wherein the controller is configured to,
   determine whether the power mode is the first power mode or the second power mode based on an event of obtaining the state information; and
   obtain the state information from the electronic apparatus via the first communication unit if the power mode is the first power mode and store the state information in the memory.

8. The information processing system according to claim 6, further comprising:
   a plurality of information processing apparatuses including the at least one information processing apparatus, wherein
   the electronic apparatus is configured to issue the shift notification to the plurality of information processing apparatuses.

9. The information processing system according to claim 8, wherein if the at least one information processing returns from a state in which the at least one information processing apparatus is not able to obtain the state information from the electronic apparatus to a state in which the at least one information processing apparatus is able to obtain the state information, the controller is configured to obtain the state information from another information processing apparatus and store the state information in the memory.

10. The information processing system according to claim 6, further comprising:
a plurality of the information processing apparatuses including the at least one information processing apparatus; and
a remote control apparatus, wherein
the electronic apparatus is configured to issue the shift notification to the remote control apparatus, and
the remote control apparatus is configured to issue the shift notification to the plurality of information processing apparatuses.

11. The information processing system according to claim 10, wherein if the at least one information processing apparatuses returns from a state in which the at least one information processing apparatus is not able to obtain the state information from the electronic apparatus to a state in which the at least one information processing apparatus is able to obtain the state information, the controller is configured to obtain the state information from another information processing apparatus and store the state information in the memory.

12. The information processing system according to claim 6, further comprising:
a remote control apparatus, wherein
when the at least one information processing apparatus returns from a state in which the at least one information processing apparatus is not able to obtain the state information from the electronic apparatus to a state in which the at least one information processing apparatus is able to obtain the state information, the controller is configured to send a shift instruction to the remote control apparatus, the shift instruction instructing the electronic apparatus to shift from the second power mode to the first power mode to,
the remote control apparatus transmits the shift instruction to the electronic apparatus,
the electronic apparatus shifts the power mode from the second power mode to the first power mode based on the shift instruction, and issues the notification of the shift to the first power mode;
the controller updates the power mode information so that the power mode information indicates the first power mode, based on the notification of the shift to the first power mode;
the controller refers to the power mode information and determines that the power mode is the first power mode; and
if the power mode is the first power mode, the controller obtains the state information from the electronic apparatus via the first communication unit and stores the state information in the memory.

13. The information processing system of claim 6, wherein the second communication unit is configured to consume less power than the first communication unit.

14. The information processing system of claim 6, wherein the controller is configured to,
store the state information based on the shift notification,
send an information request to the electronic apparatus, and
obtain the state information indicating a shift from the first power mode to the second power mode, the controller configured to store the state information during the shift from the first power mode to the second power mode.

15. A computer program product comprising a non-transitory computer-usable medium having computer-readable program codes embodied in the medium, wherein the program codes when executed cause a computer to,
store power mode information indicating whether a power mode of an electronic apparatus including a first communication unit and a second communication unit is a first power mode in which at least the first communication unit is operable or a second power mode in which the first communication unit is not operable and the second communication unit is operable;
update the power mode information based on a shift notification about the power mode of the electronic apparatus upon receiving the shift notification from an external device;
refer to the power mode information and determine whether the power mode is the first power mode or the second power mode;
obtain state information from the electronic apparatus via the first communication unit if the power mode is the first power mode, the state information indicating whether the electronic apparatus is in a state capable of selected processing;
store the state information; and
obtain the state information from the state information storage unit if the power mode is the second power mode until receiving a notification indicating that the power mode has changed to the first power mode.

16. The computer program product of claim 15, wherein the second communication unit is configured to consume less power than the first communication unit.

17. The computer program product of claim 15, wherein the computer is caused to,
store the state information based on the shift notification,
send an information request to the electronic apparatus, and
obtain the state information indicating a shift from the first power mode to the second power mode, the controller configured to store the state information during the shift from the first power mode to the second power mode.

* * * * *